United States Patent [19]

Garth

[11] 4,071,665
[45] Jan. 31, 1978

[54] HIGH ENERGY DENSITY BATTERY WITH DIOXOLANE BASED ELECTROLYTE

[75] Inventor: Bruce Hollis Garth, Newark, Del.

[73] Assignee: E. I. Du Pont de Nemours and Company, Wilmington, Del.

[21] Appl. No.: 492,937

[22] Filed: July 29, 1974

Related U.S. Application Data

[63] Continuation of Ser. No. 289,592, Sept. 18, 1972, abandoned, and a continuation-in-part of Ser. No. 249,048, Aug. 1, 1972, abandoned, which is a continuation-in-part of Ser. No. 112,413, Feb. 3, 1971, abandoned.

[51] Int. Cl.² .............................................. H01M 6/16
[52] U.S. Cl. .................................................. 429/197
[58] Field of Search ................ 136/137, 155; 429/197

[56] References Cited

U.S. PATENT DOCUMENTS

| 3,542,601 | 11/1970 | Gabano | 136/155 |
|---|---|---|---|
| 3,544,385 | 12/1970 | Newman | 136/155 |
| 3,546,022 | 12/1970 | Gabano et al. | 136/155 |
| 3,726,716 | 4/1973 | Athearn et al. | 136/137 |

OTHER PUBLICATIONS

Buhner et al., High Energy System (organic electrolyte), Feb. 1967, Report AD 648,920, prepared for the U.S. Army Material Command, pp. 2 and 3.

*Primary Examiner*—Donald L. Walton

[57] ABSTRACT

High energy density galvanic batteries having high utilization of active electrode material are prepared using voltaic cells having lithium anodes, cathode depolarizers reducible by said anodes such as cupric sulfide, and electrolytes comprising a dioxolane as solvent and up to about 20 weight percent of a conductive non-reactive electrolyte salt such as lithium perchlorate dissolved therein. Optionally up to 50 weight percent of the solvent can be a second solvent which is an aliphatic or cycloaliphatic carbohydric ether to reduce battery gassing. Additional small amounts of a tertiary nitrogen base can be added to suppress the tendency of the electrolyte system to form polymer.

2 Claims, No Drawings

HIGH ENERGY DENSITY BATTERY WITH DIOXOLANE BASED ELECTROLYTE

CROSS-REFERENCE TO RELATED APPLICATIONS

This is a continuation, of application Ser. No. 289,592, now abandoned filed Sept. 18, 1972, continuation-in-part of copending application Ser. No. 249,048, now abandoned filed May 1, 1972 which in turn was a continuation-in-part of application Ser. No. 112,413, filed Feb. 3, 1971, now abandoned.

BACKGROUND OF THE INVENTION

1. Field of the Invention

This invention relates to high energy density batteries having active metal anodes, cathode depolarizers reducible by said anodes and a nonaqueous electrolyte featuring a dioxolane as the principal solvent.

2. Prior Art

The art discloses a number of high energy density galvanic batteries having voltaic cells consisting of light metal anodes, depolarizing cathodes and liquid nonaqueous elctrolytes. French Pat. No. 1,490,726 assigned to Societe des Accumulateurs Fixes et de Traction (hereinafter S.A.F.T.) discloses several combinations of anode, cathode and non-aqueous electrolyte. Gabano et al. U.S. Pat. No. 3,511,716 also assigned to S.A.F.T., discloses that polarization effects, in such systems as disclosed in French Pat. No. 1,490,726, decrease efficiency unless there is an excess of electrolyte. Also Buhner et al., in a report AD 648,920, Feb. 1967, prepared for the U.S. Army Material Command discloses $LiClO_4$ electrolytes, but is limited in its disclosure of operable cathodes.

While the theoretical energy, i.e., the electrical energy potentially available from a selected anode-cathode couple, is easily calculated, there is a need to choose a nonaqueous electrolyte for such couple that permits the actual energy produced by the complete battery to approach the theoretical energy to a practical degree. The problem is that it is quite difficult to predict in advance how well a non-aqueous electrolyte will function, in this respect, with a selected couple. More broadly stated, such batteries must be considered as units, each unit having three parts, and the cooperative efficiency and stability of those combined parts is quite unpreditable.

SUMMARY OF THE INVENTION

In summary, this invention is directed to an improved high energy density galvanic battery comprising at least one voltaic cell comprising an electrolyte, a lithium metal anode, and a cathode depolarizer reducible by the lithium anode, the improvement comprising a non-aqueous electrolyte solution, in which the electrolyte solvent consists essentially of from 100 to about 50% by weight of a dioxolane and from 0 to about 50% by weight of an ether selected from aliphatic and cycloaliphatic carbohydric ethers having a molecular weight of no more than about 165, and dissolved therein sufficient nonreactive conductive salt to provide a conductivity at 25° C. of $1 \times 10^{-4} ohm^{-1} cm^{-1}$.

The batteries of this invention show high elctrochemical utilization of the electrode active ingredient and, with the secondary solvent present in the electrolyte, both a substantially reduced tendency to produce gas, and good low temperature performance. Tendency of the electrolyte system to polymerize can be reduced by addition of small amounts of a tertiary nitrogen base such as dimethylisoxazole, pyridine or triethylamine.

DESCRIPTION OF THE INVENTION

The description of the batteries of this invention is more easily understood when broken down to the three components, the anode, the cathode, and the electrolyte.

ANODE

The high energy density battery concept requires maximum battery energy output from a minimum weight or volume of battery components. Lithium is chosen as the anode material because it has one of the lowest equivalent weights and is the most electropositive of all the metals. Further, as a soft, ductile metal, lithium is easily disposed in a battery in operable electrical contact with a current collecting means providing an anode contact external to the battery.

Electrolyte

Broadly, the electrolyte solvent is dioxolane or substituted dioxolane, which have the formula

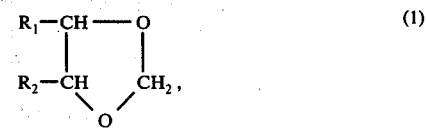

(1)

wherein $R_1$ and $R_2$ are the same or different and are hydrogen or alkyl or one to three carbon atoms, and which has dissolved therein sufficient non-reactive salt to provide a conductivity at 25° C. of at least $1 \times 10^{-4} ohm^{-4} cm^{-1}$. Preferred electrolyte solvents are those of formula (1) in which $R_1$ is hydrogen and $R_2$ is hydrogen or methyl. The most preferred solvent because of its highest performance is dioxolane, i.e., the compound of formula (1) in which $R_1$ and $R_2$ are both hydrogen.

The electrolyte salt concentration can range up to the saturation value, but usually it is preferred to avoid a saturated solution because upon cooling the battery, sufficient salt may precipitate to interfere with battery function. Therefore, preferred electrolytes ordinarily consists essentially of from about 5% to about 30% by weight of salt and from about 95% to about 70% by weight of solvent. A highly preferred combination resistant to precipitation and amply conductive consists essentially of about 10% by weight $LiClO_4$ and about 90% by weight of dioxolane. The $LiClO_4$-dioxolane system is not only highly conductive but also essentially non-reactive with lithium metal.

It is sometimes advantageous to utilize in addition to a dioxolane as the primary solvent, a secondary solvent such as an aliphatic or cycloalihpatic carbohydric ether having a molecular weight no greater than about 165. Representative of such secondary solvents are cycloaliphatic carbohydric ethers other than dioxolane composed of carbon, hydrogen and oxygen and having 3–6 members including one oxygen atom or 2 non-adjacent oxygen atoms in the ring such as ethylene oxide, propylene oxide, butylene oxide, dioxane, tetrahydropyran, dihyrofurane, and tetrahydrofurane. Other such secondary solvents are aliphatic ethers characterized by the formula $RO+CH_2CH_2O)_{\overline{n}}R$ where $n$ is 0, 1 or 2, preferably where R is methyl or ethyl and $n$ is 1 or 2. Representatives of such aliphatic ethers are diethyl ether, 1,2-dimethoxyethane, 1,2-diethoxyethane, the dimethyl ether of diethylene glycol and the diethol ether of diethylene glycol. Preferred are the 1,2-dimethoxyethane and the dimethyl ether of diethyl glycol. The secondary solvent surprisingly tends to reduce the amount of gas formed in a battery during discharge. The amount of such secondary solvent can range up to about a 1:1 weight ratio with the dioxolane. The concentration ranges for the salt in such binary solvent are the same as those for a dioxolane alonw, with about 10% by weight $LiClO_4$ and about 90% by weight of 1:1 binary solvent most preferred. Small amounts (up to about 2% by weight) of other solvents can also be used in the solvent mixture to promote the properties described above. Such solvents include methyl acetate, propylene carbonate, dimethyl carbonate and others.

A tertiary nitrogen base such as dimethylisoxazole, pyridine or triethylamine can also be added to the electrolyte solvent in small amounts, normally up to but not including 10% by weight, and preferably from about 0.1% by weight to about 1% by weight to suppress the tendency of the electrolyte system to form polymer.

A large number of electrolyte salte are useful in the electrolytes of the invention. Such salts must have sufficient solubility and dissociation to provide conductivity of at least about $1 \times 10^{-4} ohm^{-1} cm^{-1}$ in the electrolyte solution. Generally the more useful salts are those with cations chosen from groups IA and IIA of the periodic table. The most useful salts are those wherein lithium, sodium, potassium or alkylammonium are the cations. In addition to simple halogen salts more complex salts are useful, including tetrafluoroborates, hexafluorophosphates, hexafluoroarsenates, tetrachloroaluminates, and perchlorates. Also useful are salts of trichloroacetic acid, trifluoroacetic acid and trifluoromethanesulfonic acid. As indicated above, the most preferred salt is $LiClO_4$.

Cathodes

Broadly the cathodes of the invention include depolarizers reducible by lithium metal. Any element or compound lower in the scale of reduction potential than lithium could be used as a cathode. It is of course apparent that considerations of cost, corrosiveness, pressure requirements etc. make the use of many such depolarizers impractical. However, rapid progress in the field of electrical cells continually opens avenues for using new couple materials of high theoretical potential.

Representative of suitable cathode depolarizers are carbon fluoride and the oxides, fluorides sulfides, phosphates, sulfates and chromates of metals such as iron, copper, nickel, silver, vanadium and tungsten. Of such suitable depolarizers one preferred sub-class includes the sulfides and fluorides of iron, copper and nickel and their mixtures. Representative of such compounds are $FeS_2$, $FeS$, $FeF_3$, $FeF_2$, $Cu_2S$, $CuS$, $CuF_2$, $CuF$, $NiS$, $Ni_7S_6$, and $NiF$. It will be appreciated that those cathode materials having the highest electrochemical capacity are more preferred, such as the sulfides $CuS$, $FeS$, $NiS$ and $Ni_7S_6$. Particularly preferred because of their high electrochemical utilization in batteries are cathode depolarizers consisting essentially of $CuS$.

Another preferred sub-class of suitable depolarizers includes $V_2O_5$, $Ag_3PO_4$, $CuSO_4$, $CF$ and $WO_3$. Of these, carbon fluoride, tungstic oxide and silver chromate are particularly preferred because of the higher inherent voltage which they afford in batteries.

Finished cathode structures, i.e. cathode depolarizers ready for use in batteries, can be prepared by a variety of means. For example, finished rigid iron sulfide cathode structurs consisting essentially of $FeS$, i.e. having greater than 70% $FeS$ and some iron oxide, are prepared by pressing a mixture of iron and sulfur powders (1:1 atom ratio) into a coherent structure and sintering the structure at 600–650° C. for 10 to 30 minutes. Finished copper sulfide cathodes consisting essentially of $CuS$, i.e. containing more than 90% $CuS$, are similarly prepared from a mixture of copper and sulfur powders pressed into a desired shape and cured at above the melting point of sulfur following the method of Example 1 below. $NiS$ and $Ni_7S_6$ suitable for pressing into finished cathode structures of desired shapes are prepared by sintering in an inert atmosphere a 1:1 atom ratio mixture of nickel and sulfur powders at about 600° C., grinding the resulting products and then pressing the pulverized material into a cathode structure of desired shape. X-Ray diffraction analyses indicate that $Ni_7S_6$ is the major product with short periods of such sintering, e.g. up to 2.5 hours, while $NiS$ is the major product of longer sintering, e.g. 16 hours. Thus choice of sintering method provides materials consisting essentially of $Ni_7S_6$ or $NiS$.

Since the preferred sulfides are conductive they may be prepared in direct contact with a current collector means without the addition of conductive materials to provide the cathode conductivity necessary for battery use. However, performance of such cathodes is sometimes improved by the incorporation of minor amounts of a conductor such as carbon black. Usually 15% or less by weight of such conductor is utilized. However, since the fluoride oxide, chromate, phosphate and sulfate depolarizers have lower conductivity, the presence of a conductive additive is desirable before pressing them into finished cathode structures in contact with a current collector means. Usually such depolarizers are pulverized, mixed with about 5 to 15% of carbon black based on the weight of the mixture and with about 1 to 15%, same weight basis, of a resin binder such as polytetrafluoroethylene powder. The powder mixtures are then pressed into a finished cathode structure containing from 6 to 30% by weight of a conductor and binder.

Battery

This invention does not concern battery design or construction. Operability requires only that the lithium anode and the depolarizing cathode be separated buy, and in operable contact with the electrolyte, and that the electrodes be in contact with current collector means providing external contacts which can be connected to an external circuit whereby energy from the battery can be utilized. Of course, to protect the lithium anode from reactive contaminants it is usually necessary to seal such batteries.

The following examples illustrate this invention. Parts and percentages recited in such examples are by weight unless otherwise noted.

EXAMPLES

EXAMPLE 1

A 1:1 atom ratio mixture was prepared of sublimed sulfur powder and electrolytic copper dust having 50 μ maximum particle size. The mixture was aged at about 25° C. for a period of 28 days. By means of a powder press, a coherent disk of the aged mixture was compacted. The coherent disk was next cured for about 4 minutes by heating between two nickel plates previously heated to 225° C. The resulting flat cathode structure contained 0.95 grams of copper sulfide and had a single face area of 6.5 square centimeters.

Next the cathode disk was tightly fitted into a cylindrical machined recess in a nickel plate. In a dry argon atmosphere, the press in a comparable plate was packed with 0.17 grams of lithium metal. A gas-tight cell was prepared in the argon atmosphere by bolting the two plates together with insulated bolts against circular pad of inert, non-woven ceramic fiber 0.4 millimeter thick and held inside a polypropylene spacer ring of somewhat larger diameter than the cathode and anode recesses. A tight seal between the edges of the spacer and the nickel plates was assured by using synthetic chlorinated rubber gaskets. There resulted a cell with anode and cathode faces spaced 0.4 millimeter apart. The cell was evacuated and allowed to fill, until the pressure was at atmospheric pressure, with an electrolyte solution consisting essentially of 10% lithium perchlorate and 90% dioxolane. After sealing the openings in the plates used to evacuate and to fill the cell, the cell was discharged at room temperature (about 25° C.) through a constant load of 174 ohms to an arbitrary cutoff of 1.0 volt. The average discharge voltage was 1.55 volts. Cathode utilization, calculated as CuS was 79% and the cell delivered 263 watt-hours per pound of lithium and copper sulfide orginally present in the battery. The battery produced 2.5 times is internal volume of gas.

EXAMPLE 2

A battery assembled and discharged as in Example 1 but containing 85% dioxolane and 15% $LiClO_4$ showed 82% cathode utilization and produced 280 watt-hours per pound of Li and CuS. Gas volume produced was 3.6 times the internal battery volume.

EXAMPLE 3

A battery prepared as in Example 2 containing 80% dioxolane and 20% $LiClO_4$ showed 81% cathode utilizing and produced 289 watt-hours per pound of Li and CuS. Gas volume produced was 1.3 times the internal battery volume.

The following Examples 4 and 5 illustrate art disclosed cyclic ether-$LiClO_4$ based electrolytes in conjunction with Li/CuS couples. These examples when compared with Examples 1, 2 or 3 clearly demonstrate the unpredictability of how even closely related electrolyte solvents will perform with given couples and, therefore, the unpredictability of the affect of interchangng battery components on battery performance.

EXAMPLE 4

A battery, having an electrolyte consisting essentially of 90% terahydrofuran and 10% $LiClO_4$ assembled and discharged as in Example 1, showed only 25% cathode utilization and produced only 88 watt-hours per pound of Li and CuS.

EXAMPLE 5

A battery, having an electrolyte consisting essentially of 90% 4,4-dimethyldioxane-1,3 and 10% $LiClO_4$ assembled and discharged as in Example 1, showed only 1% cathode utilization and delivered only 5 watt-hours per pound of Li and CuS.

The 4,4-dimethyl-1,3-dioxane electrolyte solvent of this example is chemically very similar to the dioxolane solvent of Examples 1-3 in that both are cyclic formals, i.e., formals of a 1,3-glycol and of a 1,2-glycol.

EXAMPLE 6

A battery, having an electrolyte consisting essentially of 45% dioxolane, 45% dimethoxyethane and 10% $LiClO_4$ assembled and discharged as in Example 1, showed 75% cathode utilization, provided 271 watt-hours per pound of Li and CuS and provided only 0.98 times the internal battery volume of gas.

EXAMPLE 7

A battery was prepared as in Example 6, but with 45% of the dimethyl ether of diethylene glycol replacying the 1,2-dimethoxyethane, and it showed 74% cathode utilization, 263 watt-hours per pound of Li - CuS and 1.5 volumes of gas.

The following example demonstrates the high inertness of the dioxolane-$LiClO_4$ electrolyte to lithium anode metal.

EXAMPLE 8

A lithium sheet $1.0 \times 0.5 \times 0.05$ centimeters was stored in an electrolyte consisting essentially of 90% dioxolane and 10% $LiClO_4$ at 55° C. for 5 months. The lithium remained bright and showed no attack on the electrolyte. The electrolyte itself showed no discoloration or deterioration of any kind.

EXAMPLE 9

Test cells were prepared as in example 1 except the copper sulfur mixture was aged for a period of approximately 10 days and the disk was cured for about 5 minutes. The resulting flat cathode structure contained 0.97 grams of copper sulfide and had a single face area of 6.5 square centimeters.

After filling and sealing the cells in the manner described in Example 1 they were discharged at room teperature through a constant load of 180 ohms to an arbitrary cutoff of 1.0 volt.

Any gas produced during discharge was measured by opening the sealed cell through a metal tube and into an inverted, water-filled, volume-calibrated centrifuge tube.

With an electrolyte solution containing 90% dioxolane, 10% $LiClO_4$ and an added 0.1% of pyridine, cell discharge voltage was about 1.5 to 1.6. Cathode utilization in 48 hour tests was 80%. Gas volume in two tests was 0.7 of battery volume and 1.3 times battery volume.

When the 0.1% pyridine of the above example was replaced with 0.1% triethylamine, very similar results were attained. Cathode utilization was about 82% to 85% and gas volume was about 1.8 times battery volume.

EXAMPLE 10

Test cells were prepared as in Example 9, as was an electrolyte solution containing 90% dioxolane and 10% lithium perchlorate. Battery tests were then run with electrolyte solutions prepared by adding 3,5-dimethylisoxazole to the dioxolane-perchlorate solution. Results of these tests are shown in Table I below.

TABLE I

| % dimethyl isoxazole added | hrs. on test | % cathode utilization | Gas volume/ Battery volume |
|---|---|---|---|
| 0.1 | 54.8 | 90.6 | 0.24 |
| 0.1 | 56.5 | 88.9 | 0.24 |
| 1.0 | 53.2 | 88.4 | 0.1 |
| 1.0 | 53.0 | 82.7 | 0.0 |
| 10.0 | 54.8 | 89.5 | 0.0 |
| 10.0 | 54.3 | 90.9 | 0.0 |

In Examples 9 and 10 there were no indications of polymer formation, which sometimes occurs in LiClO$_4$-dioxolane cells.

In the tests using pyridine and trimethylamine a faint blue indicated presence of soluble cubic compound in the electrolyte, probably derived from the copper sulfide cathode or impurities therein. The tests of Example 10 showed no blue color.

EXAMPLES 11 – 38

Test cells were prepared as in Example 9 using the cathode anode and electrolyte compositions shown below in Table II. The calls were all discharged to 1.0 volt cutoff at either 25° C. or −30° C. as reflected in the table. Description of the preparation of cathode structures other than cupric sulfide follows the table.

As can be seen in Table II some cells of this invention are outstanding in terms of watt hours per pound of active electrode material. Other cells of this invention are shown to have high working voltage. Still other cells of this invention are shown to perform very well at low temperaturs. These and other desirable properties result from the combination of components of this invention.

and pestle. The resultant powder mixture was pressed in a die at 10,000 pounds per square inch and room temperature for 4 seconds to produce a coherent cathode disk.

EXAMPLES 23-24

A mixture of 82.5% commercially available cupric fluoride, 10% "Teflon" polytetrafluoroethylene powder and 7.5% Vulcan XC-72 carbon powder obtained from the Cabot Co. were blended in an Oster blender and a portion of the mixture was then pressed in a die at 5000 pounds per square inch and room temperature for 5 seconds. The resultant coherent disk was dried for one-half hour in an 80° C. vacuum oven before insertion into a cell.

EXAMPLES 25-27

Silver orthophosphate was prepared by mixing 42 milliliters of 85% orthophosphoric acid into 300 grams of 33-⅓% aqueous silver nitrate solution and then slowly adding 30% aqueous sodium hydroxide solution until no more silver phosphate precipitated. The Ag$_3$PO$_4$ precipitate was separated by filtration and was washed at pH 7 with water and dried in a 120° C. vacuum oven in the absence of light.

A mixture of 1% "Teflon" polytetrafluoroethylene powder, 5% Vulcan XC-72 carbon and 94% of the silver orthophosphate was ground and a portion of the ground mixture was then pressed in a die at 5000 pounds per square inch and room temperature for 5 seconds to produce a coherent cathode disk.

EXAMPLES 28-29

A mixture of 1% "Teflon" polyterafluoroethylene

TABLE II

| Example | Electrolyte | Cathode | Discharge Temp.° C. | Working Voltage under load | Watt hours per lb. of total cathode wt. | Watt hours per cu.in. of cell | current milliamps/cm$^2$ of electrodes |
|---|---|---|---|---|---|---|---|
| 11 | D | CuS | 25 | 2.05, 1.55 | 310 | 12.2 | 1.35 |
| 12 | C | " | " | 1.55 ave. | 100 | 4.1 | 1.27 |
| 13 | D | " | −30 | — | 5 | 0.2 | 0.98 |
| 14 | C | " | −30 | — | — | — | — |
| 15 | A | " | 25 | 2.05, 1.55 | 325 | 12.9 | 1.35 |
| 16 | B | " | 25 | 2.02, 1.53 | 300 | 11.3 | 1.33 |
| 17 | A | " | −30 | 1.4 ave. | 22 | 0.87 | 1.23 |
| 18 | B | " | −30 | 1.9, 1.2 | 140 | 4.3 | 1.22 |
| 19 | E | " | 25 | 2.05, 1.55 | 388 | 15.4 | 1.34 |
| 20 | A | V$_2$O$_5$/C | 25 | 3.25, 1.85 | 242 | 8.5 | 1.17 |
| 21 | B | " | 25 | 3.15, 1.60 | 150 | 5.3 | 1.20 |
| 22 | B | " | −30 | 2.32 ave. | 60 | 2.1 | 1.16 |
| 23 | B | CuF$_2$/C/teflon | 25 | 2.60 | 63 | 2.7 | 2.07 |
| 24 | B | " | −30 | 2.40 | 50 | 2.1 | 1.92 |
| 25 | A | Ag$_3$PO$_4$/C/teflon | 25 | 3.00 | 180 | 12.0 | 2.34 |
| 26 | B | " | 25 | 2.90 | 181 | 12.0 | 2.10 |
| 27 | B | " | −30 | 1.60 ave. | 35 | 2.3 | 1.31 |
| 28 | A | CuSO$_4$/C/teflon | 25 | 2.60 | 125 | 4.8 | 2.02 |
| 29 | B | " | −30 | 1.2 ave. | 8 | 0.3 | 1.00 |
| 30 | A | Ag$_2$CrO$_4$/C/teflon | 25 | 2.95, 2.55, 1.90, 1.10 | 315 | 18.0 | 1.87 |
| 31 | B | " | 25 | 2.90, 2.50, 1.85, 1.05 | 270 | 15.4 | 1.80 |
| 32 | B | " | −30 | 2.40, 1.90, 1.50 | 180 | 10.2 | 1.80 |
| 33 | E | " | 25 | 2.95, 2.55, 1.90, 1.10 | 350 | 20.0 | 1.92 |
| 34 | A | CF$_{1.1}$/C | 25 | 2.15 | 423 | 15.1 | 1.79 |
| 35 | A | CF$_{0.9}$/C | 25 | 2.20 | 465 | 16.3 | 1.74 |
| 36 | A | CF$_{0.7}$/C/teflon | 25 | 2.50 | 394 | 9.9 | 1.93 |
| 37 | A | CF$_{0.5}$/C/teflon | 25 | 2.70 | 396 | 9.9 | 1.92 |
| 38 | A | NO$_3$/C/teflon | 25 | 2.50 | 93 | 3.2 | 1.73 |

Electrolyte A = 10% LiClO$_4$ 25% ethylene glycol dimethyl ether 64.5% 1,3-dioxolane 0.5% 3,5-dimethylisoxazole
Electrolyte B = 10% LiClO$_4$ 89.5% 1,3-dioxolane 0.5% 3,5-dimethylisoxazole
Electrolyte C = 10% LiClO$_4$ 90% tetrahydrofuran
Electrolyte D = 10% LiClO$_4$ 63% tetrahydrofuran 27% ethylene glycol dimethyl ether
Electrolyte E = 10% LiAsF$_6$ 25% ethylene glycol dimethyl ether 64.5% 1,3-dioxolane 0.5% 3,5-dimethylisoxazole
All cells discharged to 1.0 volt cut-off.

EXAMPLES 20-22

A mixture of 80% commercially available vanadium pentoxide and 20% graphite was ground with a mortar powder, 5% Vulcan XC-72 carbon and 94% commercially available cupric sulfate which had been rendered anhydrous in a 180° C. vacuum oven was ground and a portion of the ground mixture was then pressed in a die at 15,000 pounds per square inch and room temperature for 4 seconds to provide a coherent cathode disk.

EXAMPLES 30–33

A mixture of 1% "Teflon" polytetrafluoroethylene, 5% Vulcan XC-72 carbon and 94% commercially available silver chromate were ground with a mortar and pestle and then in an Oster blender and a portion of the mixture was then pressed in a die to 10,000 pounds per square inch and room temperature for 4 seconds to produce a coherent cathode disk.

EXAMPLES 34–35

A mixture of 10% Vulcan XC-72 carbon and 90% of commercially available carbon fluoride were ground with a mortar and pestle and a portion of the mixture was then pressed in a die at 1000 pounds per square inch and room temperature for 5 seconds to produce a coherent cathode disk. For Example 34 carbon fluoride was used which had a molecular ratio of fluorine to carbon in accordance with its chemical formula $CF_{1.1}$. For Example 35 carbon fluoride was used which had a molecular ratio of carbon to fluoride in accordance with its chemical formula $CF_{0.9}$.

EXAMPLES 36–37

A mixture of 10% Vulcan XC-72 carbon, 1% "Teflon" polytetrafluoroethylene powder and 89% of commercially available carbon fluoride were ground with a mortar and pestle and a portion of the mixture was then pressed in a die at 5000 pounds per square inch and room temperature for 5 seconds to produce a coherent cathode disk. For example 36 carbon fluoride was used which had a molecular ratio of fluorine to carbon in accordance with its chemical formula $CF_{0.7}$. For Example 37 carbon fluoride was used which had a molecular ratio of fluorine to carbon in accordance with its chemical formula $CF_{0.5}$.

EXAMPLE 38

Tungstic oxide was prepared by slowly adding a solution of 68 grams of sodium hydroxide in 400 milliliters of water to 212 grams of tungstic acid in 400 milliliters of water. The resultant mixture was added slowly with vigorous agitation to 500 milliliters of boiling concentrated hydrochloric acid. The $WO_3$ precipitate was separated by filtration and was washed with 20% aqueous ammonium nitrate solution until no chloride ion appeared in the washing. The washed $WO_3$ was dried first in a 110° C. oven and then overnight in a 600° C. oven. The dry product had a surface area of 21 square meters per gram.

A mixture of 1% "Teflon" polytetrafluoroethylene powder, 5% Vulcan XC-72 carbon and 94% of the tungstic oxide was blended in an Oster blender. A portion of the blended mixture was then pressed in a die at 5000 pounds per square inch and room temperature for 5 seconds to provide a coherent cathode disk.

EXAMPLE 39

Galvanic cels were prepared with copper sulfide cathodes, lithium anodes and the following electrolyte
64.5% 4-methyl-1,3-dioxolane
25.0% 1,2-dimethoxyethane
0.5% lithium perchlorate.
Two of these cells, designated A and B, were compared with a similar cell, designated C, in which the electrolyte was 10% lithium perchlorate, 90% dioxolane. The cells were discharged through 150-ohm loads to a 1.5 volt cutoff with the following results.

| Cell | Hrs. on test | Aug. volts | Aug. milliamps | Amp-hours | Watt-hours |
|---|---|---|---|---|---|
| A | 66 | 1.90 | 12.7 | 0.83 | 1.58 |
| B | 48 | 1.78 | 11.9 | 0.57 | 1.01 |
| C | 69 | 2.00 | 13.3 | 0.92 | 1.82 |

The above example can be repeated, substituting for the 4-methyldioxolane in the electrolyte dioxolanes substituted as shown in formula (1) to produce batteries demonstrating high electrochemical utilization of the electrode active ingredients. Representative of suitable substituted dioxolanes are
4-ethyl-1,3-dioxolane,
4-propyl-1,3-dioxolane,
4,5-dimethyl-1,3-dioxolane,
4-methyl-5-propyl-1,3-dioxolane,
4-methyl-5-ethyl-1,3-dioxolane,
4,5-diethyl-1,3-dioxolane,
4-ethyl-5-propyl-1,3-dioxolane, and
4,5-dipropyl-1,3-dioxolane.

The embodiments of the invention in which an exclusive property or privilege is claimed are defined as follows:

1. In a high energy density galvanic battery comprising at least one voltaic cell comprising a lithium metal anode, an electrolyte solution and a cathode depolarizer reducible by the lithium anode, the improvement comprising a non-aqueous electrolyte solution in which the electrolyte solvent consists essentially of from 99.9 to about 50% by weight of a dioxolane of the formula

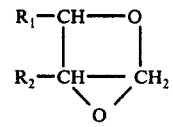

wherein $R_1$ and $R_2$ are the same or different and are hydrogen or alkyl of one to three carbon atoms, from 0 to about 50% by weight of an ether selected from aliphatic ethers and cycloaliphatic carbohydric ethers having a molecular weight of no more than about 165, an about from 0.1% to 10% by weight of a tertiary nitrogen base, dissolved therein sufficient nonreactive conductive salt to provide a conductivity at 25° C. of 1 $\times 10^{-4} ohm^{-1} cm^{-1}$.

2. In a high energy density galvanic battery comprising at least one voltaic cell comprising a lithium metal anode, an electrolyte solution and a cathode depolarizer reducible by the lithium anode, the improvement comprising a non-aqueous electrolyte solution in which the electrolyte solvent consists essentially of from about 75% to about 50% by weight of a dioxolane of the formula;

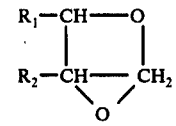

wherein $R_1$ and $R_2$ are the same or different are hydrogen or alkyl of one to three carbon atoms, and from about 25% to 50% by weight of an ether selected from aliphatic ethers and cycloaliphatic carbohydric ethers having a molecular weight of no more than about 165 and dissolved therein sufficient non-reactive conductive salt to provide a conductivity at 25° C. of 1 $\times 10^{-4} ohm^{-1} cm^{-1}$.

* * * * *